United States Patent [19]
Le Gigan

[11] Patent Number: 5,349,876
[45] Date of Patent: Sep. 27, 1994

[54] MEASUREMENT APPARATUS AND METHOD FOR BULK PRODUCTS, INCLUDING AT LEAST ONE WEIGHT MEASUREMENT

[75] Inventor: Dominique Le Gigan, Parmain, France

[73] Assignee: Star Partners, Chicago, Ill.

[21] Appl. No.: 897,284

[22] Filed: Jun. 11, 1992

[30] Foreign Application Priority Data

Jun. 13, 1991 [FR] France ................ 91 07216

[51] Int. Cl.⁵ .................... G01N 33/00; G01G 19/00
[52] U.S. Cl. .................... 73/866; 73/863.41; 73/863.42; 73/436; 177/145; 177/199; 177/245
[58] Field of Search ............ 73/866, 433, 435, 436, 73/863.41, 863.51, 863.52; 177/145, 161, 199, 245, 253

[56] References Cited

U.S. PATENT DOCUMENTS

| 359,525 | 3/1887 | Weber et al. | 177/145 |
| 553,606 | 1/1896 | Bohn | 177/245 |
| 1,370,226 | 3/1919 | Rosener | 177/145 |
| 2,893,602 | 7/1959 | Barber et al. | 177/253 |
| 3,797,633 | 3/1974 | Stambera . | |
| 4,168,466 | 9/1979 | Boldt | 324/664 |
| 4,431,071 | 2/1984 | Magat et al. . | |
| 4,527,647 | 7/1985 | Ueda | 177/253 |
| 4,588,091 | 5/1986 | Wade . | |

FOREIGN PATENT DOCUMENTS

| 0046130 | 2/1982 | European Pat. Off. . | |
| 2098486 | 3/1972 | France . | |
| 2123158 | 1/1984 | United Kingdom | 177/145 |

Primary Examiner—Hezron E. Williams
Assistant Examiner—Daniel S. Larkin
Attorney, Agent, or Firm—Willian Brinks Hofer Gilson & Lione

[57] ABSTRACT

The invention relates to an apparatus for measuring products, including at least one hopper for feeding the product, at least one cell intended to receive the product and provided with a means for opening and closing for arbitrary evacuation of the product after measurement, and a weighing sensor. The apparatus according to the invention is distinguished in that it includes a structure that is movably mounted to reciprocate vertically up and down with respect to a fixed frame, the structure including support means for said cell for driving it in its motion over at least part of its vertical course, and that the weighing sensor is mounted on a part of the fixed frame, and that it is arranged to support said ceil by assuring its measurement, in a predetermined position of the travel thereof, this position called the weighing position, from which a motion of the movable structure in one direction disunites the structure from the cell, while in the other direction, it is the sensor that is disunited from said cell. The invention also relates to a method for measurement by means of such an apparatus.

29 Claims, 4 Drawing Sheets

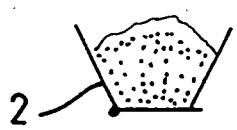
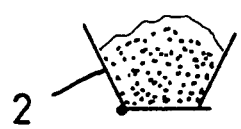
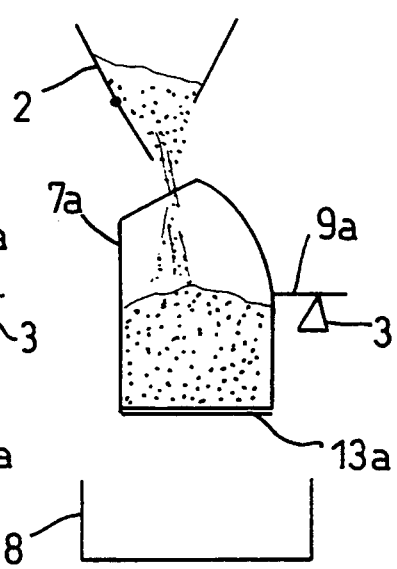
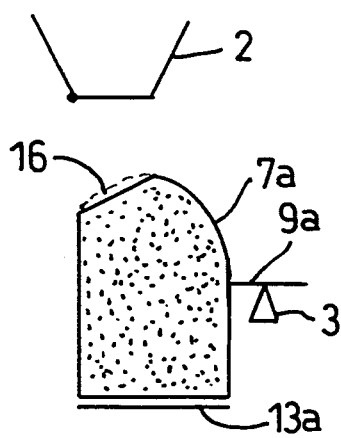
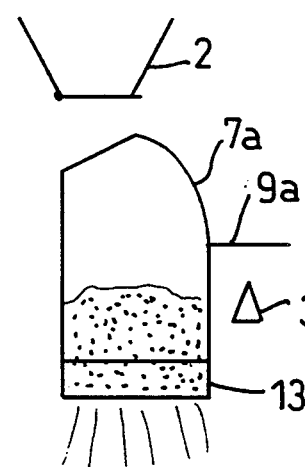
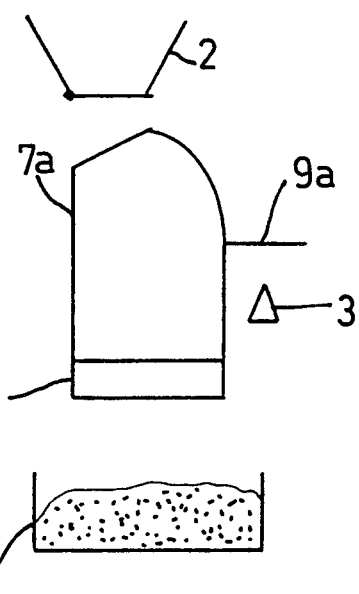

MEASUREMENT APPARATUS AND METHOD FOR BULK PRODUCTS, INCLUDING AT LEAST ONE WEIGHT MEASUREMENT

MEASUREMENT APPARATUS AND METHOD FOR BULK PRODUCTS, INCLUDING AT LEAST ONE WEIGHT MEASUREMENT

Applicant claims, under 35 U.S.C. § 119, the benefit of priority of the filing date of June 13, 1991, of a French application, copy attached, Ser. No. 9,107,216, filed on the aforementioned date, the entire contents of which are incorporated herein by reference.

FIELD OF THE INVENTION

The invention relates to a measurement method and apparatus for bulk products, wherein at least one weight measurement of the product is taken. The measurement method and apparatus is used to take measurements of various products, which may include granular or powdered products, such as cereals or the like.

BACKGROUND OF THE INVENTION

Various types of measurement equipment are available for performing measurements of cereal in grain form. These measurements may relate to several parameters, such as the test weight or test weight the weight for a given volume.

To measure the specific gravity, weighing must be done at a constant volume of the product in question. While the measurement of the test weight is undertaken, another measurement can be taken such as a measurement of the moisture content of the product, example.

Various types of equipment, which include a weighing sensor, are known for the purpose of performing multiple measurements of a product, but they have the particular disadvantage that the weighing sensor is under stress at all times. Such equipment also includes several motors or actuators for controlling the various devices for opening, closing or other actions.

OBJECT AND SUMMARY OF THE INVENTION

The present invention relates to an apparatus and method of taking measurements of a bulk product wherein one of the measurements involves using a weighing sensor. The invention and method are simply designed to, among other features, protect the weighing sensor by not stressing it except when necessary (that is, for the initial measurements, measurements during filling, and for the final measurements).

Moreover, the apparatus according to the invention makes it possible to verify the calibration of the weighing sensor in each weighing cycle, as will be explained hereinafter.

The apparatus according to the invention may have various applications such as measuring the moisture content of cereals or oleaginous or proteinaceous products, by capacitive effect.

These objects are attained by an apparatus measuring a product having a hopper for feeding the product into a cell to receive the product. The cell is provided with a means for opening and closing for arbitrary evacuation of the product after treatment. The apparatus further includes a structure that is movably mounted to reciprocate vertically up and down with respect to a fixed frame, wherein said structure comprises support means for said cell for driving it in its motion over at least part of its vertical course.

Furthermore, a weighing sensor is included, wherein said weighing sensor is mounted on a part of the fixed frame, and is arranged to support said cell by assuring its measurement, in a predetermined position of the travel thereof, this position called the weighing position, from which a motion of the movable structure in one direction disunites the structure from the cell, while in the other direction, it is the sensor that is disunited from said cell.

The invention also relates to a method for measurement of a product, comprising the steps of: (a) establishing a zero setting of the cell by weighing it empty, by causing said cell to rest on a weighing sensor, (b) filling the cell with the product to be analyzed after having closed a flap of the cell and opening a feed hopper, (c) closing the feed hopper, (d) weighing the filled cell, and (e) opening the cell to evacuate the product.

The invention will be better understood and further features thereof will become more apparent from the ensuing description of an exemplary embodiment, taken in conjunction with the drawings.

BRIEF DESCRIPTION OF THE DRAWINGS

FIGS. 4a–4f are schematic functional diagrams of the method according to an embodiment of the invention.

DESCRIPTION OF THE PREFERRED EMBODIMENT

Figure 1:
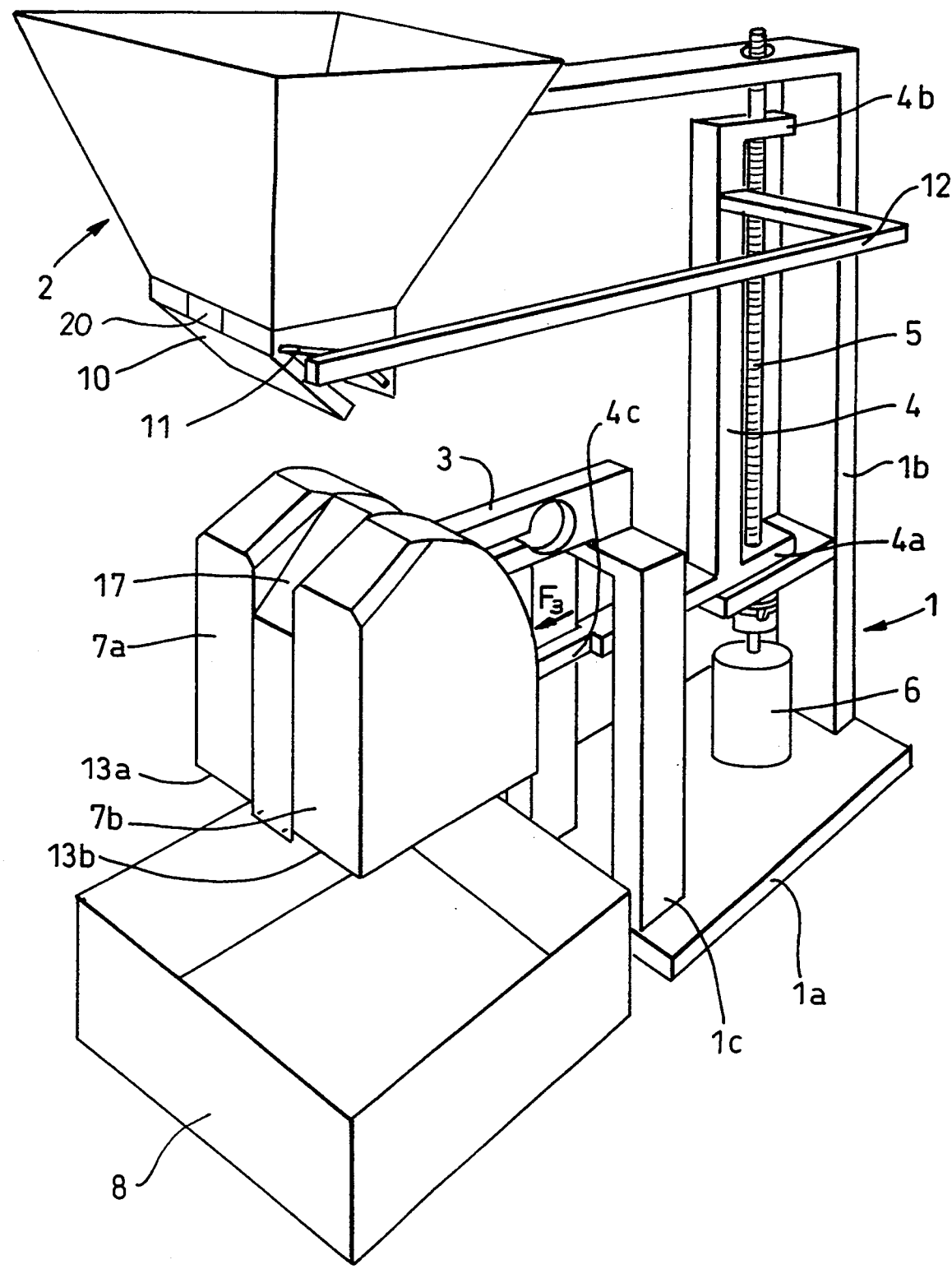
FIG. 1 is a perspective of an apparatus according to an embodiment of the invention.

The apparatus of the invention includes a frame 1 having a base 1a, a bracket 1b and a support 1c. A feed hopper 2 is fixed to the bracket 1b, and a weighing sensor 3 is disposed on the support 1c.

The apparatus also includes a movable structure 4, which is coupled to an endless screw 5, which provides a reciprocating vertical up and down motion to the movable structure 4. The endless screw 5 is driven to rotate arbitrarily in one direction or the other by a motor or servo mechanism 6 (for example, a bidirectional electric motor) mounted on the frame. The movable structure 4 is provided with conjugate threaded holes of the screw located at parts 4a and 4b of the moveable structure 4. Thus, when screw 5 is rotated, movable structure 4 moves up or down.

The movable structure 4 also includes a support 4c intended to support a set of two cells 7a and 7b, under which a recovery receptacle 8 is located. As schematically shown by the sectional view of FIGS. 2a–2e, cells 7a and 7b are joined to one another by braces at 9a, 9b. Between these cells, an inclined plane 17 may be provided to assure better flow of any excess product. The sensor and the support 4c of the movable structure 4 are arranged to cooperate with the braces to assure the underpinning of the cells in the position for weighing by the sensor and in motion by the movable structure, respectively. The sectional view of FIGS. 2a–2e is located precisely along a vertical plane passing between cells 7a and 7b.

A feed hopper 2 is provided with a trap door 10 urged into the closing position by a restoring means schematically shown as box 20 in FIG. 1. An actuation means for opening the door is provided for cooperating with a conjugate means united with the movable structure 4.

As shown in FIGS. 1 and 2a–2e, the flap is equipped with an actuation means such as a stop or cam 11 which is united with the door. The stop 11, preferably in the form of a handle, cooperates with a conjugate means such as an arm 12, which is united with the movable structure 4. The arm 12 is intended to come to rest on the stop and cause the opening of the door in the course of the vertical motion of the movable structure. The arm 12 could be replaced by a cable coacting with a thrust tied to the trap door.

Braces 9a and 9b include means to cooperate with corresponding elements arranged on the weighing sensor 3 and the support 4c. The cooperation between the braces and the weighing sensor or support 4c allows the cells to be supported either by the support 4c or by the sensor 3, depending on the position of the movable structure 4 with respect to the fixed position of the sensor 3. An example of this cooperation is shown in FIGS. 2a–2e in which the braces 9a and 9b have case openings which cooperate with projections arranged on the sensor 3 and support 4c.

The cells 7a and 7b each include doors 13a, 13b, respectively, in their lower portion, for the evacuation of the product. Furthermore, the doors 13a, 13b of the cells 7a, 7b are each urged into the closing position by a restoring means (not shown). As shown in FIGS. 3a–3ed, each door 13a, 13b is provided with a corresponding lever 14a, 14b, respectively, which is intended to cooperate with a corresponding arm 15a, 15b united with the frame 1 to open the doors.

Furthermore, the opening and closing cell may include a door which is arranged under the cell and which is urged to close by a restoring means, while an actuating means is provided for cooperating with a conjugate means united with the fixed frame. The actuating means of the door of the cell has the form of a lever or stop united with the door, while the conjugate means united with the frame is an arm or prong intended to come to rest on the lever or stop and to cause the opening of the door in the course of the vertical motion of the cell.

Figure 2A:
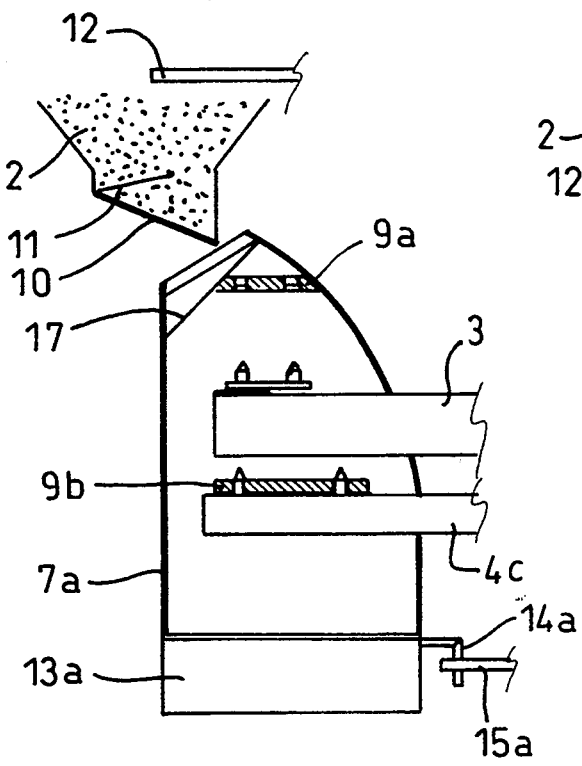
FIGS. 2a–2e schematically show a vertical section through part of the apparatus of FIG. 1, in five different positions.
Figure 2B:
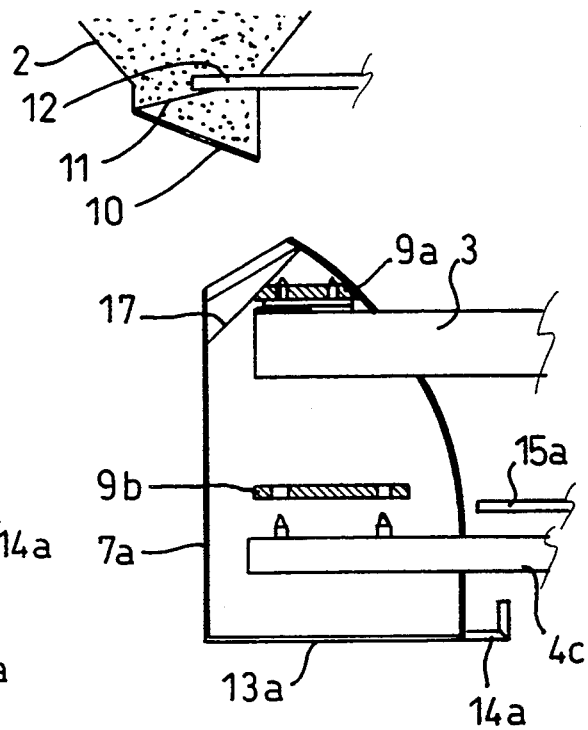
Figure 2C:
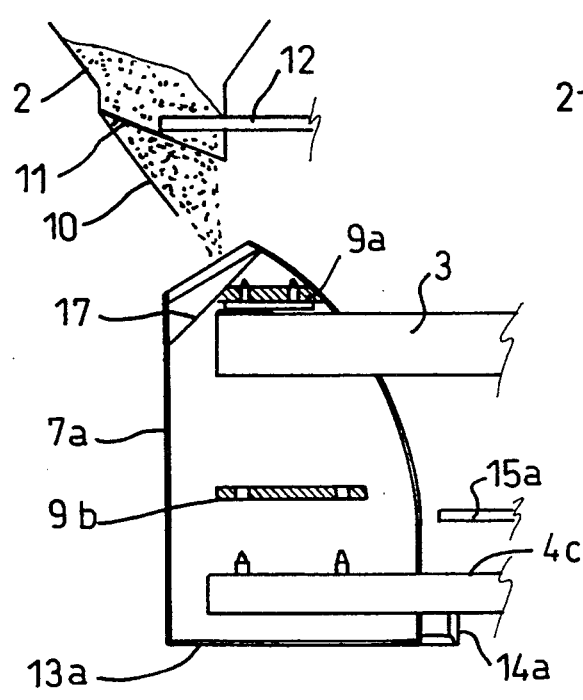
Figure 2D:
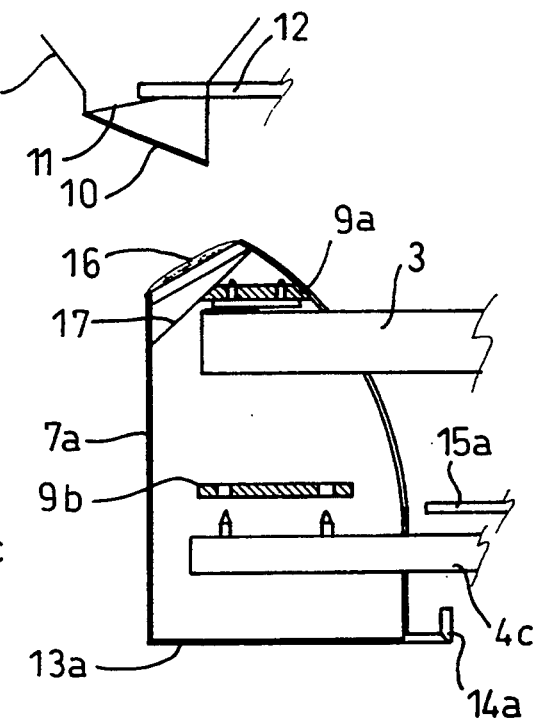
Figure 2E:
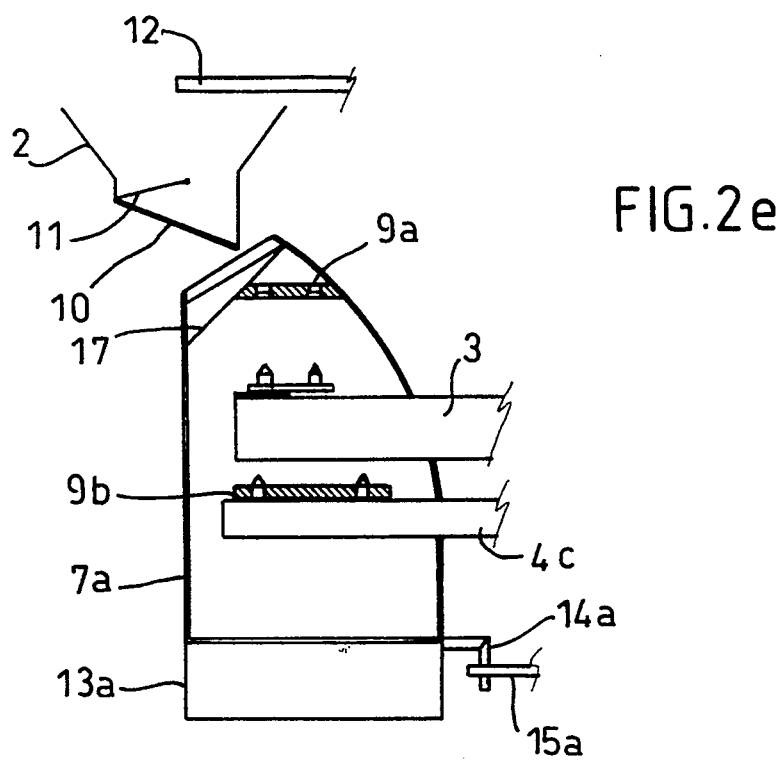

Upon viewing FIGS. 2a2e; FIGS. 3a–3e; and FIGS. 4a–4f, one is able to understand the measurement method of the present invention. In an initial position shown in FIGS. 2a, 3a, and 4a, the movable structure is in repose and is in the upper position. In the upper position, the cells are carried by the support 4c, which cooperates with the brace 9b. It can be seen that in this position, the hopper 2 is closed (being urged to close by its restoring means) and the arm 12 is clearly higher than the stop 11. Furthermore, the doors 13a, 13b of the cells 7a, 7b are in the open position because the fixed arms 15a and 15b press on the levers 14a, 14b counter to their restoring means. It should be noted that the cells 7a, 7b are preferably open when in repose for the purpose of aeration, complete evacuation, air circulation enabling a rapid return to ambient temperature of any possible temperature sensor, etc.

Figure 3A:
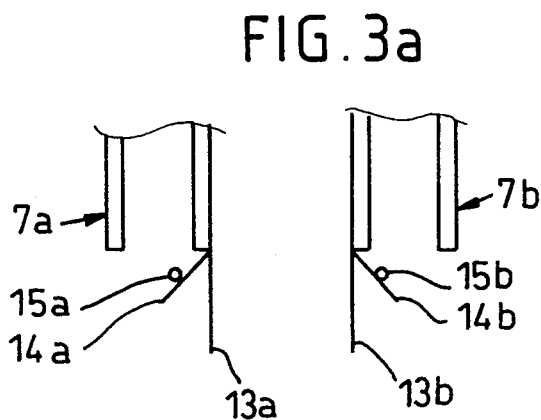
FIGS. 3a–3d, in a view taken in the direction of the arrow $F_3$ of FIG. 1, schematically show conjugate means of the cell and of the frame for opening the frame.
Figure 3B:
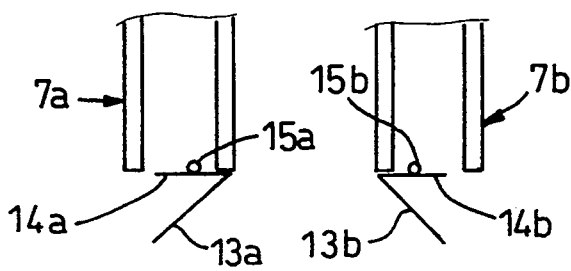
Figure 3C:
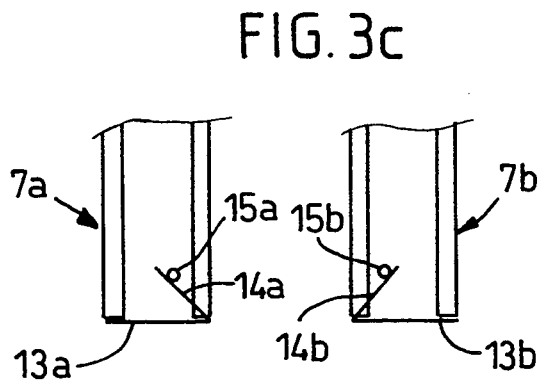
Figure 3D:
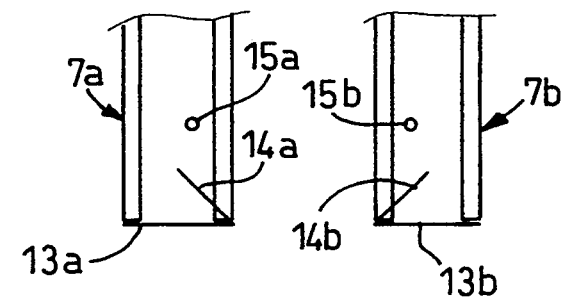

From the upper position, the movable structure 4 begins its descent by means of the motor 6 to reach a second or calibration position shown in FIGS. 2b, 3d and 4b. In the second position the brace 9a cooperates with the sensor 3, so that sensor 3 supports the cells 7a, 7b, while simultaneously support 4c is disengaged from the brace 9b. In the course of the passage from the upper repose position to the second position, the doors 13a and 13b close, since the cells, as they descend, cause a relative shift upward of the arms 15a, 15b with respect to cells 7a, 7b. This closing process is particularly seen in FIGS. 3b to 3d, where FIGS. 3b and 3c show two intermediate positions between position 2a, 4a and position 2b, 4b.

Since the sensor 3 supports the cells 7a, 7b, it is clear that the second position allows for zeroing to take place, or in other words, allows for the initial measurement of the empty weight of the cells. In addition, knowing the actual weight of the cell makes it possible also to check the sensitivity of the sensor in the second position.

As the descent of the movable structure 4 continues, a shift is made from the second position to a lower third filling position of the structure, as seen in FIGS. 2c, 3d, 4c. In the third position, the arm 12 presses against the stop 11 of the hopper 2 such that the hopper opens resulting in the filling of the cells.

The relative position of the levers 14a, 14b and arms 15a, 15b for the doors 13a, 13b in the third filling position is shown more particularly in FIG. 3d. As one can see the relative position for these elements is unchanged from the second position, since the cell is immobilized from the second position to the third position.

From the third position, the movable structure 4 rises again to a fourth weighing position as seen in FIGS. 2d, 3d, 4d. The fourth position corresponds to the second position in all aspects except the cells are full in the fourth position and not empty as in the second position. Thus, in the fourth position, the hopper 2 is closed while the sensor 3 measures the weight of the full cells.

From the fourth position, the movable structure continues its reascent and arrives at a fifth emptying and return position as seen in FIGS. 2e, 3a, 4e, 4f, which corresponds to the initial repose position. As seen in FIGS. 4e, 4f, the doors 13a, 13 are open, so the cell is empty.

To summarize, it will now be understood that the apparatus moves successively to the following positions:

1) Initial position: FIGS. 2a, 3a, 4a
2) Zeroing position: FIGS. 2b, 3d, 4b
3) Filling position: FIGS. 2c, 3d, 4c
4) Weighing position for full cells: FIGS. 2d, 3d, 4d
5) Emptying and return position: FIGS. 2e, 3a, 4e, 4f It will also be understood that a shift is made through the first, second and third positions while descending, and through the third, fourth, and fifth positions while reascending, and that mechanically the first and fourth positions and the second and fifth positions are similar.

As the drawings clearly show, the shape of the cells is advantageous, because it allows for self-leveling. As shown in FIGS. 2d and 4d, a dome 16 of excess product may form, but which is markedly reduced in size and thus assures greater reliability in the repetition of measurements at constant volume. This particular feature is the subject of a U.S. patent application filed by the present applicant and having the same filing date of the present application. The application has the title of "Measurement Cell For Granular Or Powdered Products" and an attorney docket number of 4656/5.

It is also clear that other measurements may be made during and/or between certain phases described above.

In particular, as already noted, the apparatus according to the invention makes it possible to check the sensor. In the positions shown in FIGS. 2a and 2e, the weighing sensor 3 is completely free, i.e., the measurement value the sensor furnishes corresponds to a free position or absolute zero value. In this way, any shift from this zero value that might develop over the course of time (particularly as a function of temperature) can be known, and can therefor be taken into account. By way of example, the sensor 3 is of the strain gage type, with constant moment.

The apparatus according to the invention may also include only a single motor, while many shifts are performed by mechanical means combined with a single general motion.

In the case of capacitive measurement of the moisture content, the side walls of the cells may constitute the plates of the measurement capacitors. In that case, these cells may also be connected in parallel (with the capacitances of the capacitors being added to one another). Recording and processing of the measurement will not be described in further detail here.

The various mechanical means are given by way of non-limiting example, and it is certainly possible to modify them or to conceive of other means (for example, a jack in place of the screw 5, cam or cable systems for the doors trap 10, 13a and 13b, and so forth). Moreover, guide means, not shown, are preferably provided for the movable structure, and the trap door of the hopper 2 may be double, so as to fill each cell more precisely.

It is also possible to use only a single cell, or contrarily to use more than two, and so forth. For various applications, during and/or between at least certain of the operations performed at positions 1-5, other measurements besides weighing are performed, by means of suitable sensors. These may for example be measurements of temperature, pressure, moisture content, and so forth.

A highly advantageous method is distinguished in that operations performed at the initial and second positions are effected in the course of a descending motion of the movable structure, and operations performed at the third through the fifth positions are effected in the course of a reascent of the movable structure.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An apparatus for measuring a product, comprising:
   a hopper for feeding the product;
   a cell to receive the product through an opening and provided with a trap door and a means for opening and closing said trap door for evacuation of the product after measuring the product;
   a structure that is movably mounted to reciprocate along a vertical direction with respect to a fixed frame, wherein said structure comprises support means for engaging said cell for driving said cell along said vertical direction;
   a weighing sensor mounted on a part of the fixed frame and arranged to support said cell at a predetermined weighing position located along the vertical direction, wherein at said weighing position said movable structure is disengaged from said cell and motion of the movable structure in one direction results in said movable structure engaging said cell and the sensor disengaging from said cell.

2. The measurement apparatus of claim 1, wherein said support means for the movable structure and the sensor are disposed in such a manner that the cell passes from the support means of the movable structure to the sensor in the course of a descending motion of the structure, and contrarily from the sensor to the support means of the movable structure in the course of an upward motion.

3. The apparatus of claim 1, wherein the feed hopper comprises an evacuation trap door which is urged to close by a restoring means, while an actuation means for opening it is provided for cooperating with a conjugate means united with the movable structure.

4. An apparatus for measuring a product, comprising:
   a hopper for feeding the product;
   a cell to receive the product and provided with a means for opening and closing for arbitrary evacuation of the product after measuring the product;
   a structure that is movably mounted to reciprocate along a vertical direction with respect to a fixed frame, wherein said structure comprises support means for engaging said cell for driving said cell along said vertical direction;
   a weighing sensor mounted on a part of the fixed frame, and that it is arranged to support said cell at a predetermined weighing position located along the vertical direction, wherein at said weighing position said movable structure is disengaged from said cell and motion of the movable structure in one direction results in said movable structure engaging said cell and the sensor disengaging from said cell,
   wherein said support means for the movable structure and the sensor is disposed in such a manner that the cell passes from the support means of the movable structure to the sensor in the course of a descending motion of the structure, and contrarily from the sensor to the support means of the movable structure in the course of an upward motion; and
   wherein the feed hopper comprises an evacuation trap door which is urged to close by a restoring means, while an actuation means for opening it is provided for cooperating with a conjugate means united with the movable structure.

5. An apparatus for measuring a product, comprising:
   a hopper for feeding the product;
   a cell to receive the product and provided with a means for opening and closing for arbitrary evacuation of the product after measuring the product;
   a structure that is movably mounted to reciprocate along a vertical direction with respect to a fixed frame, wherein said structure comprises support means for engaging said cell for driving said cell along said vertical direction;
   a weighing sensor mounted on a part of the fixed frame, and that it is arranged to support said cell at a predetermined weighing position located along the vertical direction, wherein at said weighing position said movable structure is disengaged from said cell and motion of the movable structure in one direction results in said movable structure engaging said cell and the sensor disengaging from said cell, wherein the feed hopper comprises an evacuation trap door which is urged to close by a restoring means, while an actuation means for opening it is provided for cooperating with a conjugate means united with the movable structure; and wherein the actuation means of the door of the feed hopper has the form of a stop that is united with said door, while the conjugate means united with the movable structure is an arm intended to come to rest on said stop and cause the opening of said door in the course of vertical motion of said movable structure.

6. The apparatus of claim 4, wherein the actuation means of the door of the feed hopper has the form of a stop that is united with said door, while the conjugate means united with the movable structure is an arm intended to come to rest on said stop and cause the opening of said door in the course of the vertical motion of said movable structure.

7. An apparatus for measuring a product, comprising:
a hopper for feeding the product;
a cell to receive the product and provided with a means for opening and closing for arbitrary evacuation of the product after measuring the product;
a structure that is movably mounted to reciprocate along a vertical direction with respect to a fixed frame, wherein said structure comprises support means for engaging said cell for driving said cell along said vertical direction;
a weighing sensor mounted on a part of the fixed frame, and that it is arranged to support said cell at a predetermined weighing position located along the vertical direction, wherein at said weighing position said movable structure is disengaged from said cell and motion of the movable structure in one direction results in said movable structure engaging said cell and the sensor disengaging from said cell; and
wherein the means for opening and closing the cell comprises a door which is arranged under said cell and which is urged to close by a restoring means, while an actuating means is provided for cooperating with a conjugate means united with the fixed frame.

8. The apparatus of claim 6, wherein the means for opening and closing the cell comprises a door which is arranged under said cell and which is urged to close by a restoring means, while an actuating means is provided for cooperating with a conjugate means united with the fixed frame.

9. The apparatus of claim 7, wherein the actuating means of the door of the cell has the form of a lever or stop united with said door, while the conjugate means united with the frame is an arm or prong intended to come to rest on said lever or stop and to cause the opening of said door in the course of a vertical motion of said cell.

10. The apparatus of claim 8, wherein the actuating means of the door of the cell has the form of a lever or stop united with said door, while the conjugate means united with the frame is an arm or prong intended to come to rest on said lever or stop and to cause the opening of said door in the course of the vertical motion of said cell.

11. The apparatus of claim 1, comprising at least two distinct cells connected to one another by braces.

12. The apparatus of claim 10, comprising at least two distinct cells connected to one another by braces.

13. The apparatus of claim 11, wherein the sensor and the movable structure support means are arranged for cooperating with said braces to assure the underpinning of the cells in the weighing position and assure said cell is driven along said vertical direction by the movable structure, respectively.

14. The apparatus of claim 12, wherein the sensor and the movable structure support means are arranged for cooperating with said braces to assure the underpinning of the cells in the weighing position and assure said cell is driven along said vertical direction by the movable structure, respectively.

15. The apparatus of claim 11, wherein each cell forms a measurement capacitor and the cells being electrically connected in parallel, thereby allowing for the measurement of the moisture content of cereals or oleaginous or proteinaceous products by capacitive action.

16. The apparatus of claim 12, wherein each cell forms a measurement capacitor and the cells being electrically connected in parallel, thereby allowing for the measurement of the moisture content of cereals or oleaginous or proteinaceous products by capacitive action.

17. The apparatus of claim 13, wherein each cell forms a measurement capacitor and the cells being electrically connected in parallel, thereby allowing for the measurement of the moisture content of cereals or oleaginous or proteinaceous products by capacitive action.

18. The apparatus of claim 14, wherein each cell forms a measurement capacitor and the cells being electrically connected in parallel, thereby allowing for the measurement of the moisture content of cereals or oleaginous or proteinaceous products by capacitive action,.

19. The apparatus of claim 1, wherein the movable structure comprises a motor or servo mechanism for vertical motion.

20. The apparatus of claim 18, wherein the movable structure comprises a motor or servo mechanism for vertical motion.

21. An apparatus for measuring a product, comprising:
a hopper for feeding the product and having a door that opens and closes;
a cell to receive the product and provided with a means for opening and closing a door of the cell for arbitrary evacuation of the product after measuring the product;
a structure that is movably mounted to reciprocate along a vertical direction with respect to a fixed frame, wherein said structure comprises support means for engaging said cell for driving said cell along said vertical direction;
a weighing sensor mounted on a part of the fixed frame, and that it is arranged to support said cell at a predetermined weighing position located along the vertical direction wherein at said weighing position said movable structure is disengaged from said cell and motion of the movable structure in one direction results in said movable structure engaging said cell and the sensor disengaging from said cell,
wherein said support means for the movable structure and the sensor is disposed in such a manner that the cell passes from the support means of the movable structure to the sensor in the course of a descending motion of the structure, and contrarily from the sensor to the support means of the movable structure in the course of an upward motion; and wherein the support means of the movable structure, the weighing sensor, the door of the feed hopper and the door of the cell are arranged in such a manner that in the course of a descending motion of the movable structure from an initial high position, in which the cell is carried by said movable structure, the door of the feed hopper and the door of the cell being respectively closed and open, a shift is made to a position where the cell rests on the weighing sensor, while in the course of this descent the door of the cell closes, and that a continuation of the descent brings about the opening of the door of the feed hopper, while an ascent of the movable structure causes the opposite successive situations.

22. An apparatus for measuring a product, comprising:
- a hopper for feeding the product;
- a cell to receive the product and provided with a means for opening and closing a door of the cell for arbitrary evacuation of the product after measuring the product;
- a structure that is movably mounted to reciprocate along a vertical direction with respect to a fixed frame, wherein said structure comprises support means for engaging said cell for driving said cell along said vertical direction;
- a weighing sensor mounted on a part of the fixed frame, and that it is arranged to support said cell at a predetermined weighing position located along the vertical direction, wherein at said weighing position said movable structure is disengaged from said cell and motion of the movable structure in one direction results in said movable structure engaging said cell and the sensor disengaging from said cell,
- wherein the feed hopper comprises an evacuation trap door which is provided with a door urged to close by a restoring means, while an actuation means for opening it is provided for cooperating with a conjugate means united with the movable structure; and
- wherein the support means of the movable structure, the weighing sensor, the actuating means of the trap door of the feed hopper and the door of the cell are arranged in such a manner that in the course of a descending motion of the movable structure from an initial high position, in which the cell is carried by said movable structure, the trap door of the feed hopper and the door of the cell being respectively closed and open, a shift is made to a position where the cell rests on the weighing sensor, while in the course of this descent the door of the cell closes, and that a continuation of the descent brings about the opening of the trap door of the feed hopper, while an ascent of the movable structure causes the opposite successive situations.

23. The apparatus of claim 4, wherein the support means of the movable structure, the weighing sensor, the actuating means of the trap door of the feed hopper and the door of the cell are arranged in such a manner that in the course of a descending motion of the movable structure from an initial high position, in which the cell is carried by said movable structure, the trap door of the feed hopper and the door of the cell being respectively closed and open, a shift is made to a position where the cell rests on the weighing sensor, while in the course of this descent the door of the cell closes, and that a continuation of the descent brings about the opening of the trap door of the feed hopper, while an ascent of the movable structure causes the opposite successive situations.

24. The apparatus of claim 8, wherein the support means of the movable structure, the weighing sensor, the actuating means of the trap door of the feed hopper and the door of the cell are arranged in such a manner that in the course of a descending motion of the movable structure from an initial high position, in which the cell is carried by said movable structure, the trap door of the feed hopper and the door of the cell being respectively closed and open, a shift is made to a position where the cell rests on the weighing sensor, while in the course of this descent the door of the cell closes, and that a continuation of the descent brings about the opening of the trap door of the feed hopper, while an ascent of the movable structure causes the opposite successive situations.

25. A method for measurement of a product, comprising the steps:
(a) zeroing a measurement cell by weighing it empty, by causing said cell to rest on a weighing sensor;
(b) filling the cell with the product to be analyzed after having closed a door of the cell and opening a feed hopper;
(c) closing the feed hopper;
(d) weighing the filled cell;
(e) opening the cell to evacuate the product, wherein steps (a) and (b) are effected in the course of a descending motion of a movable structure that is engagable with said cell, and steps (c)–(e) are effected in the course of a reascent of said movable structure.

26. The method of claim 25, wherein during and/or between a step (a)–(e), other measurements besides weighing are performed, by means of suitable sensors.

27. A method for measurement of a product, comprising the steps:
(a) zeroing a measurement cell by weighing it empty, by causing said cell to rest on a weighing sensor;
(b) filling the cell with the product to be analyzed after having closed a door of the cell and opening a feed hopper;
(c) closing the feed hopper;
(d) weighing the filled cell;
(e) opening the cell to evacuate the product; wherein steps (a) and (b) are effected in the course of a first motion performed by a movable structure that is engagable with said cell, and steps (c)–(e) are effected in the course of a second motion of said movable structure.

28. The method of claim 27, wherein during and/or between a step (a)–(e), other measurements besides weighing are performed, by means of suitable sensors.

29. An apparatus for measuring a product, comprising:
- a hopper for feeding the product;
- a cell to receive the product from said hopper;
- a structure that is movably mounted to reciprocate along a first direction with respect to a fixed frame, wherein said structure comprises support means for engaging said cell for driving said cell along said first direction;
- a weighing sensor mounted on a part of the fixed frame, and that it is arranged to support said cell at a predetermined weighing position located along the first direction, wherein at said weighing position said movable structure is disengaged from said cell and motion of the movable structure in one direction results in said movable structure engaging said cell and the sensor disengaging from said cell.

* * * * *

UNITED STATES PATENT AND TRADEMARK OFFICE
CERTIFICATE OF CORRECTION

PATENT NO. : 5,349,876
DATED : September 27, 1994
INVENTOR(S) : Dominique Le Gigan Page 1 of 2

It is certified that error appears in the above-indentified patent and that said Letters Patent is hereby corrected as shown below:

On the Title Page

In line 14 of the ABSTRACT, delete "ceil" and substitute --cell--.

Col. 6:

In claim 4, line 43, delete "sensor" and substitute --pickup--.

Col. 7:

In claim 5, line 11, after the first occurrence of "of" insert --a--.

In claim 6, line 18, delete the second occurrence of "the" and substitute --a--.

Col. 8:

In claim 18, line 33, delete ",".

In claim 21, line 56, after "direction" insert --,--.

Col. 9:

In claim 22, line 37, delete the second occurrence of "door" and substitute --flap--.

UNITED STATES PATENT AND TRADEMARK OFFICE
CERTIFICATE OF CORRECTION

PATENT NO. : 5,349,876
DATED : September 27, 1994
INVENTOR(S) : Dominique Le Gigan It is certified that error appears in the above-indentified patent and that said Letters Patent is hereby corrected as shown below:

Col. 9:

Col. 10:
    In claim 41, line 27, delete "structure" and substitute --outfit--.

In claim 42, line 10, delete ";" and substitute --,--.

Signed and Sealed this

Thirtieth Day of May, 1995

BRUCE LEHMAN

*Attest:*

*Attesting Officer*     *Commissioner of Patents and Trademarks*